United States Patent Office 3,036,332
Patented May 29, 1962

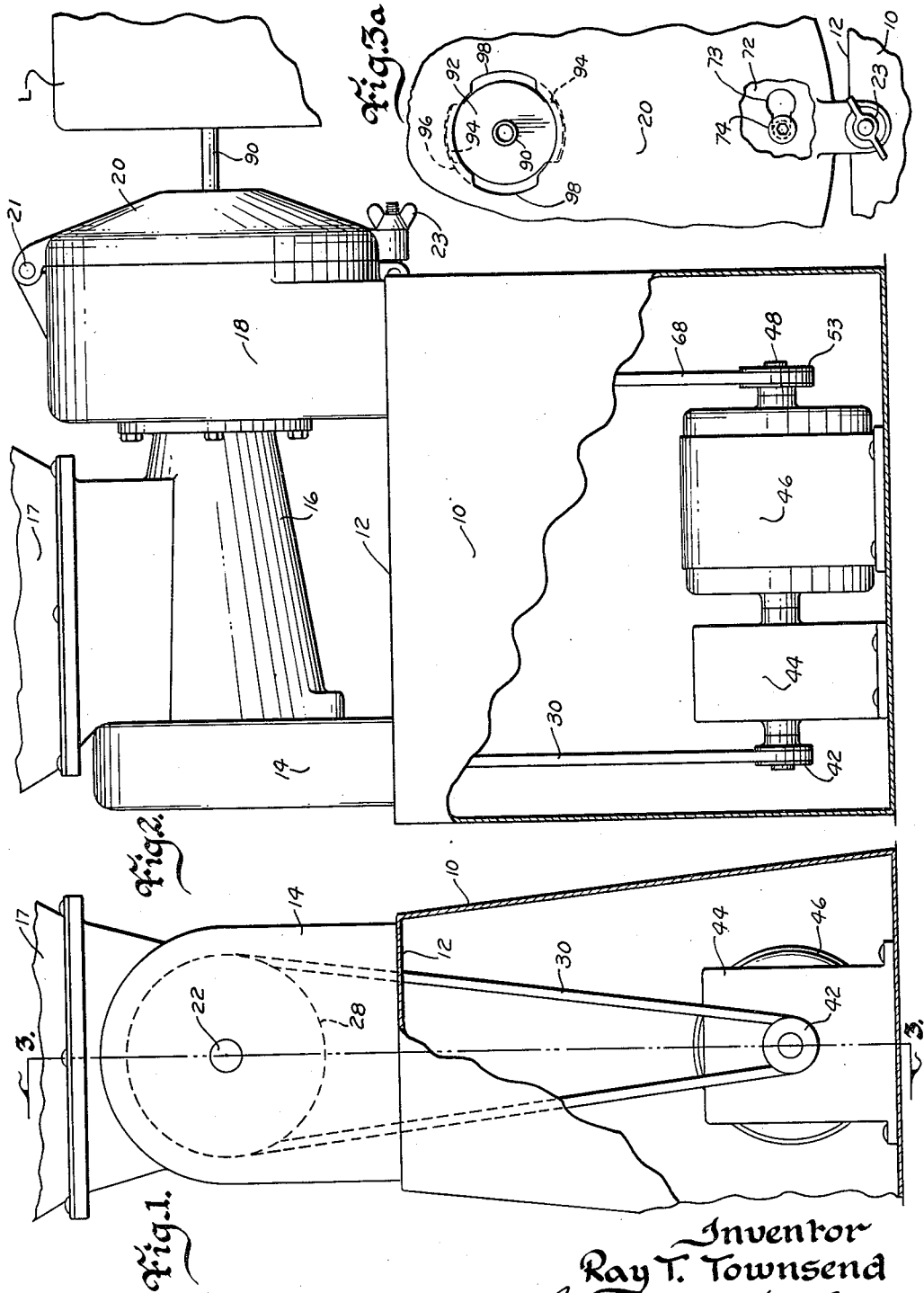

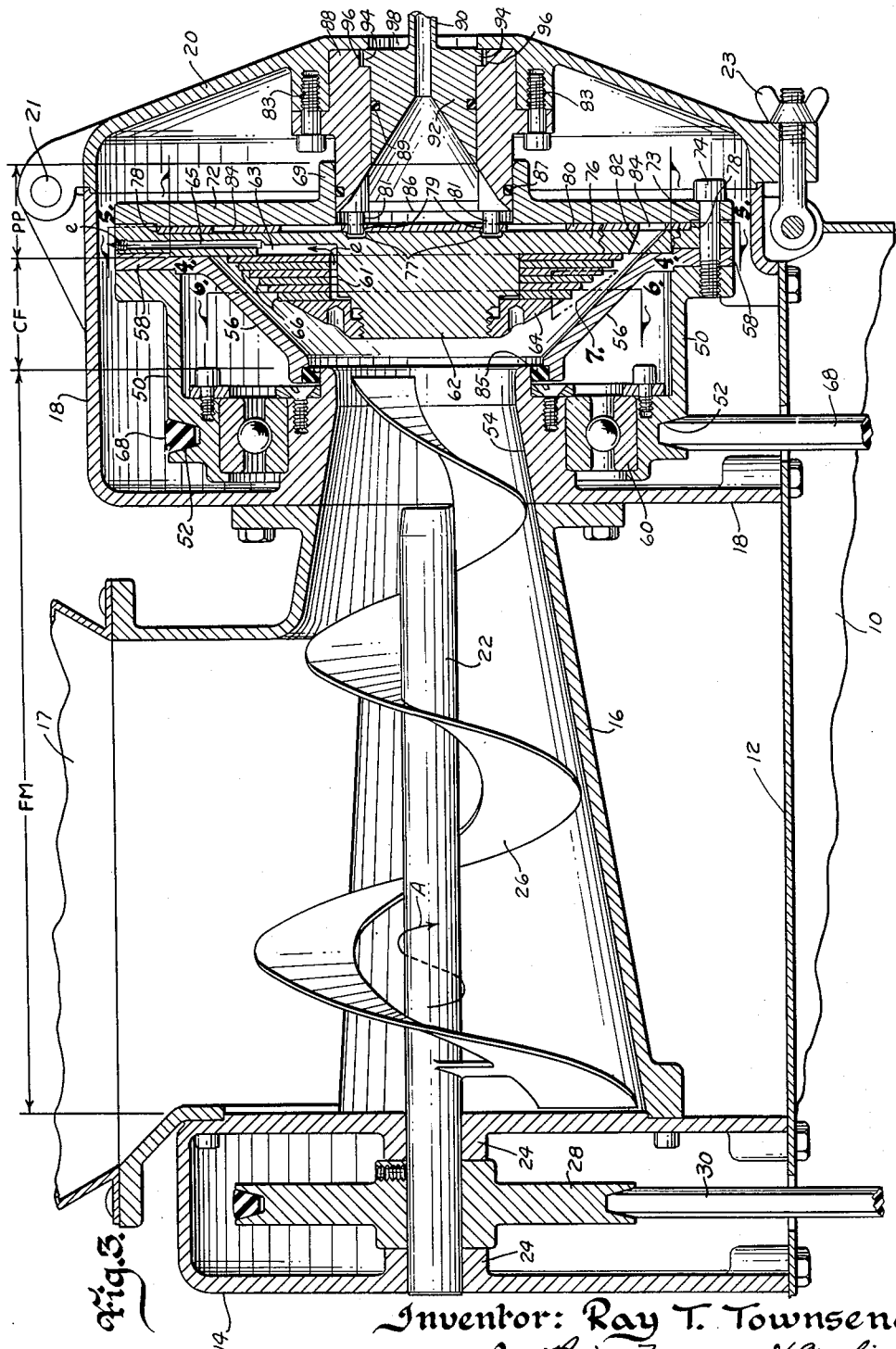

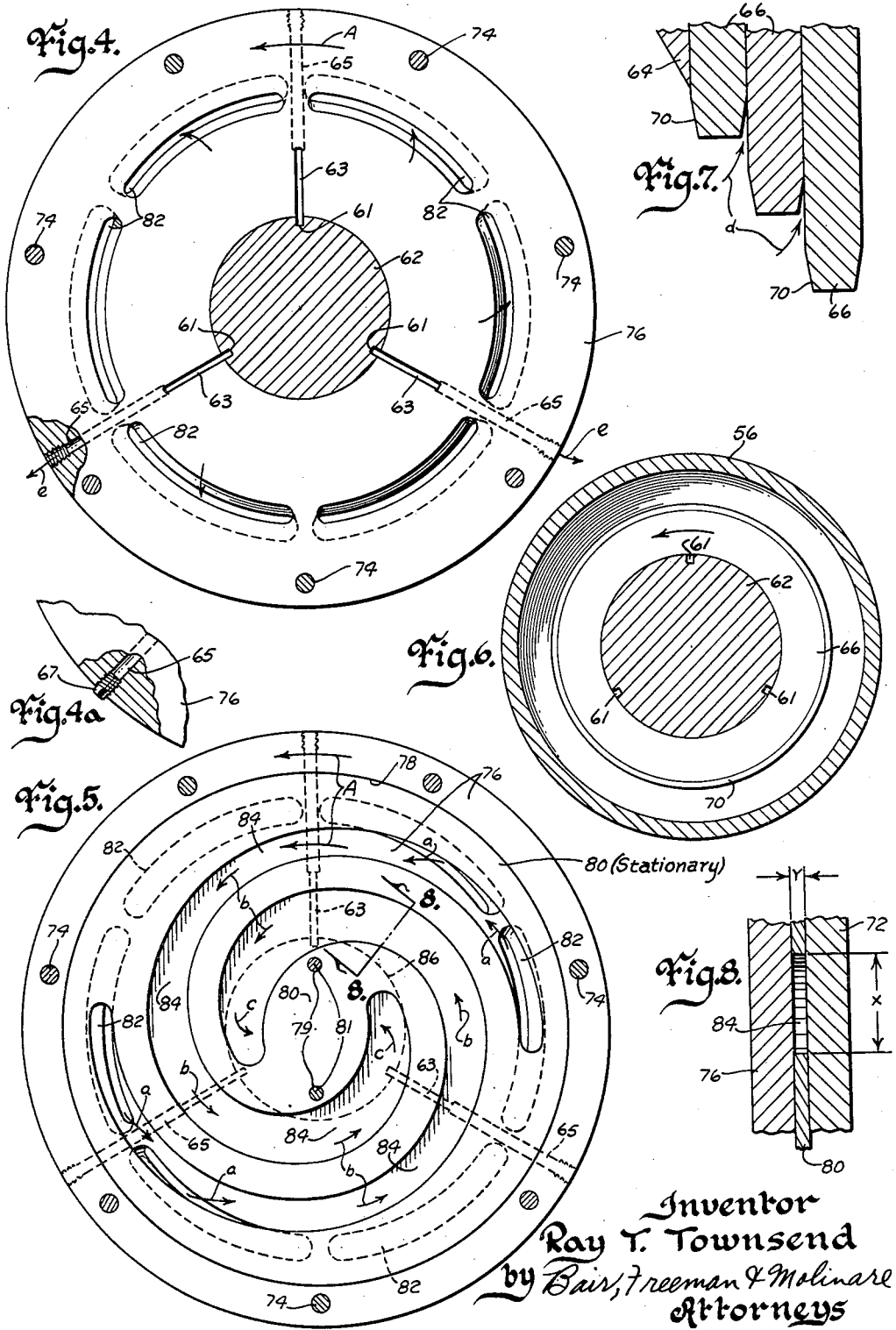

3,036,332
CONTINUOUS MEAT STUFFER
Ray T. Townsend, Des Moines, Iowa, assignor to Townsend Engineering Company, Des Moines, Iowa, a corporation of Iowa
Filed Sept. 11, 1958, Ser. No. 760,453
16 Claims. (Cl. 17—35)

This invention relates to a machine for stuffing meat into casings and thereby forming baloney, wieners, sausages, and the like, continuous stuffing being possible for exceptionally long casings.

One object of the invention is to provide a stuffer for ground meat and the like that may also extract entrained air from the meat so as to provide a more compactly stuffed casing which has better keeping qualities because of the elimination of deterioration of the meat by the presence of air bubbles.

Another object of this invention is to provide a stuffing machine for stuffing meat and the like into casings therefor comprising feed means and a stuffing pump, air extracting means being selectively incorporated if desired for extracting entrained air from the ground meat.

Another object is to provide a stuffing machine that has means to extract air from a material such as ground meat and the like by centrifugal force.

Still another object is to provide a meat casing stuffer having a hopper to receive ground meat and auger means to propel the meat from the hopper into a centrifuge that is so constructed as to effectively remove entrained air from the meat and feed the meat under pressure into a stuffing pump which increases the pressure and feeds the meat to a stuffer tube from which it may be expelled into a meat casing.

A further object is to provide a cylinder surrounding the discharge end of the auger which is rotated at considerably higher speed than the auger and terminates in a centrifuge in which the entrained air is extracted from the meat, and which includes a stuffing pump to pressure-feed the meat into a stuffing tube projecting from the discharge end of my meat stuffer.

Still another object is to provide a centrifuge including a chamber in which the ground meat and entrained air may flow radially under the action of centrifugal force, a meat pump being provided to propel the meat adjacent the periphery of the centrifuge back toward the axis of rotation where the stuffing tube is located.

An additional object is to provide a novel form of pressurizing pump for the ground meat to pump it from the periphery of the centrifuge inwardly to a stuffing tube located substantially at the center of the centrifuge, comprising a central plate and a pair of plates on opposite sides thereof, the central plate and the pair of plates being relatively movable and the central plate having guide slots which spiral inwardly in the direction of rotation of the two plates relative to the center plate and which increase in width to facilitate flow of the ground meat therealong from the periphery to the center of the pump.

With these and other objects in view, my invention consists in the construction, arrangement and combination of the various parts of my continuous meat stuffer, whereby the objects above contemplated are attained, as hereinafter more fully set forth, pointed out in my claims and illustrated in detail on the accompanying drawings, wherein:

FIG. 1 is an end elevation partially in section of a continuous meat stuffer embodying my invention;

FIG. 2 is a side elevation thereof, also partially in section and showing an adjacent linker;

FIG. 3 is an enlarged vertical sectional view on the line 3—3 of FIG. 1 showing details of construction of my continuous meat stuffer;

FIG. 3a is a fragmentary end view of the right-hand end of FIG. 3;

FIG. 4 is a vertical sectional view on the line 4—4 of FIG. 3 illustrating details of a centrifuge of my machine;

FIG. 4a is a fragmentary view partially in section of a portion of FIG. 4 showing a modification;

FIG. 5 is a vertical sectional view on the line 5—5 of FIG. 3 showing details of a material pressurizing pump of my machine;

FIG. 6 is a vertical sectional view on the line 6—6 of FIG. 3 showing further details of the centrifuge;

FIG. 7 is an enlargement of that portion of FIG. 3 within the triangular area 7; and FIG. 8 is an enlarged sectional view on the line 8—8 of FIG. 5.

On the accompanying drawings I have used the reference numeral 10 to indicate a base housing for my machine, the top of which constitutes a table 12 on which the operating portion of my machine is mounted. A belt housing 14 is provided from which an auger housing 16 of tapered character extends as illustrated in FIG. 2, and the housing 16 has a hopper 17 to receive the material (usually ground meat) to be stuffed into a casing as will hereinafter appear.

A centrifuge and pump housing 18 is provided, also mounted on the table 12 and partially forming an extension of the right-hand end of the auger housing 16 as shown in FIG. 3. A pump cover plate 20 is hinged as at 21 to the housing 18 and is normally retained in the closed position by a wing nut 23. An auger shaft 22 is mounted in bearings 24 of the belt housing 14, and a spirally wound feed auger 26 is provided thereon. The auger shaft 22 is driven by means of a pulley 28 thereon, a belt 30 and a pulley 42 from a speed reducer 44. The speed reducer in turn is driven by a motor 46, the shaft of which is shown at 48.

Before proceeding further with description of details, reference is made to FIG. 3 wherein my continuous stuffing machine is roughly divided into three sections:

FM—a feed means
CF—a centrifuge
PP—a pressurizing pump

In general, the feed means receives the material to be stuffed and the slowly rotating feed auger 26 thereof (for example, 80 r.p.m.) produces slight pressure to feed material into the centrifuge CF wherein entrained air is extracted from the material, and the material is fed into the pressurizing pump PP. In the pressurizing pump, pressure is exerted on the material to discharge it from a stuffing tube 90 on which a meat receiving casing has been placed, as will hereinafter appear, and a relatively long length of such casing is filled, after which the casing can be linked by hand, on a linking table or the stuffed casing can be fed into a special linker shown generally at L.

The feed means FM has already been described. The centrifuge CF comprises a cone 56 having a peripheral flange 58, which is supported by a cylinder 50 having a pulley groove 52 in the periphery thereof. The cone 56 is secured to the cylinder 50 by means of several cap screws 74 which, as will hereinafter appear, also secure other parts to the cone, and the cylinder 50 is rotatably supported relative to an internal boss 54 of the housing 18 by a bearing 60.

The centrifuge CF further includes an intake disc 76, a plurality of graduated diameter, washer-like filter discs 66 and a cone 64 which serves as a retainer nut for clamping the discs 66 against the left-hand face of the intake disc 76. The intake disc is provided with an enlarged hub 62 which the filter discs 66 surround, as shown in FIG. 3, and which is threaded on its left-hand end for the cone nut 64. The nut tightly clamps the discs 66 in assembled position. As shown in FIG. 7 the peripheral marginal edges of the discs 66 may advantageously be bevelled as indicated at 70 for a purpose which will hereinafter appear.

The intake disc 76 forms part of the pressurizing pump PP as it is provided with meat receiving openings 82 near its periphery communicating with the peripheral space inside the cone 56 to receive meat from the cone. Meat is fed through the openings 82 to a pump disc 80 having therein meat guiding slots 84. As shown in FIGS. 4 and 5, the meat receiving openings 82 are six in number and are curved and slot-like, whereas the meat guiding slots 84 of the pump disc 80 are two in number and graduated in width, being narrower at their outer ends than at their inner ends, the purpose of which will hereinafter appear.

The pump PP also includes an outlet disc 72, and the disc 80 is mounted in a counterbore 78 of the disc 76 and confined between the bottom of this counterbore and the disc 72 by the cap screws 74. Relative rotation is provided between the disc 80 and the disc 72 and 76 on opposite sides thereof by holding the disc 80 stationary, whereas the discs 72 and 76 may be rotated by a suitable belt 68 in the pulley groove 52 passing around a pulley 53 on the motor shaft 48. The rotation may be in the neighborhood of 1000 r.p.m. for air extraction purposes, as will be later described. The disc 80 is relatively thin when compared with the discs 76 and 72. The disc 80 is held stationary by a pair of pins 81 located in a meat receiving cone 88 which provides a cone-shaped meat discharge opening 86 (its largest diameter is shown dotted in FIG. 5) leading to the stuffing tube 90. The cone 88 is secured to the pump cover plate 20 by cap screws 83, and the pins 81 are carried by the cover 20 when it is opened, the pins 81 loosely passing through holes 79 in the plate 80 and entering an annular groove 77 in the plate 76.

The stuffing tube 90 is supported by a sleeve 92, and the sleeve has a bayonet connection with the cover 20 so that it, with its tube 90, may be removed and another sleeve 92 and tube 90 of a different diameter may be substituted for changing from one size of meat receiving casing to another when stuffing them. The bayonet connection comprises a pair of opposite bayonet flanges 94 on the sleeve 92 to pass through bayonet notches 98 in the cover plate 20 and enter bayonet grooves 96 in the meat receiving cone 88 for convenience in readily disconnecting one size of stuffing tube 90 and substituting another size. An O-ring seal 89 prevents leakage between the meat receiving cone 88 and the sleeve 92. Suitable seals against leakage of meat and/or air are also provided between the boss 54 and the cone 56 at 85, and between a boss 69 on the outlet disc 72 and the meat receiving cone 88 at 87.

For convenience in disassembling the parts of the centrifuge CF and the pressurizing pump PP for cleaning purposes, the cover 20 is hinged as already described, and the cone 56 and the discs 72, 76 and 80 are mounted on the cylinder 50 by means of the cap screws 74 which form part of a bayonet connection between the discs and the cylinder. The flange 58 of the cone 56 and the discs 76 and 72 are each provided with bayonet slots 73 (see FIG. 3a) to receive the screws 74. By removing the stuffing tube 90 and its sleeve 92 from the cover 20 it may readily be cleaned, and thereupon the cover 20 may be opened to permit clockwise rotation of the cone 56 and the discs 76 and 72 to align the enlarged portions of the bayonet slots 73 with the heads of the screws 74, whereupon the cone and discs may be removed for cleaning them as well as the disc 80.

PRACTICAL OPERATION

Operation of Feed Means FM

In the operation of my continuous meat stuffer, the feed means FM feeds the ground meat or other material from the hopper 17 along the auger housing 16 and through the internal boss 54 of the housing 18 by relatively slow rotation of the auger 26 in the direction of the arrow A found on FIG. 3. As it is well known, an auger operating in this manner produces relatively slight feeding pressure, and such pressure is insufficient for stuffing casings of continuous length which may be as long as 50 to 100 feet. It is, therefore, necessary to interpose a pressurizing pump between the feed means and the stuffing tube 90 to produce the necessary pressure for feeding the ground meat into the casing and compacting it therein. After the continuous length of casing has been stuffed, it is "linked" or divided into separate lengths by tying or twisting between the links, and this may be performed in the linker L as hereinbefore referred to.

Operation of Centrifuge CF

The centrifuge is operated by rotation thereof as also indicated by the arrows A in FIGS. 4, 5 and 6 which is the same direction of rotation as the auger 26 but at a higher speed, rotation of course being effected by the belt 68 whereby the cylinder 50, the cone 56, the discs 66, 76 and 82, and the cone 64 are also rotated. Operation of the centrifuge CF effectively removes entrained air from the meat in the following described manner.

Since the centrifuge is rotating, meat entering the cone 56 is thrown outwardly therein by centrifugal force, which acts upon both the meat and the entrained air, but with greater force on the meat due to its greater specific gravity. The meat is thereby compacted against the inner surface of the cone 56 while the air is driven toward the cone 64 and the peripheral edges of the discs 66. The air is squeezed by the meat into the spaces provided by the bevels 70 as indicated in FIG. 7 by the arrows d and travels across the surfaces of the discs 66 which, though rather tightly engaged with each other and against the disc 76 by the retainer nut 64, nevertheless present sufficient space for filtering action to permit flow of air but prevent flow of meat. At the same time the stepped arrangement of the peripheries of the discs 66 provides a turbulence for the flow of the ground meat so as to facilitate extraction of the entrained air therefrom. Centrifugal force acting on the meat more than on the air squeezes the air into the interstices between the discs 66 to enter the bores thereof and flow around the hub 62. The air enters the axial grooves 61 and then finds its way to the radial grooves 63 wherein it is forced radially outward by centrifugal force and through the air discharge openings 65 to atmosphere within the housing 18—20 (see arrows e in FIGS. 3 and 4), whereby the air is disposed of due to rotation of the centrifuge CF.

The discs 66 may be stamped from sheet metal as it comes from the rolling mill, as I have found the surfaces thereof sufficiently rough as compared to ground and honed surfaces that enough space is present to permit flow of air, yet the space is so little as to effectively filter out any meat and thus the desired filtering action is obtained. If the action is insufficient, the surfaces may be further roughened as by etching or the like.

Operation of Pressurizing Pump PP

Centrifugal force acting on the ground meat in the centrifuge CF forces the meat through the meat receiving openings 82 of the intake disc 76 and into the outer ends of the meat guide slots 84 as indicated by the arrows a in FIG. 5. Since the discs 72 and 76 on opposite sides of the disc 80 are rotating in the direction of arrows a and the disc 80 is held stationary by the pins 81 and the cover 20, the surfaces of the disc 72 and 76 which face each other create a frictional drag on the meat in the guide slots 84, which tends to move the meat as indicated by the arrows b toward the inner ends of the spirally arranged slots to exit as indicated by the arrows c into the discharge opening 86 of the meat receiving cone 88. Referring to FIG. 8, the area creating the drag is indicated by the dimension line X. There will also be frictional drag between the meat and the opposite inner edges of the guide slots 84, but there is much less as indicated by the dimension line Y. Accordingly, the greater area X causes more drag than the lesser area Y, thus effecting the movement of meat as indicated by the arrows a, b and c. Since the slots 84 become wider as they approach the discharge opening 86, the desired movement of the meat from the meat receiving openings 82 to the meat discharge opening 86 is further facilitated.

In some cases it is undesirable to remove the entrained air from the meat, and in that event the air extracting function of the centrifuge CF may be destroyed as by plugging the air discharge openings 65 by means of plugs 67 (see FIG. 4a). Thereupon, the feed means FM operates in the normal manner, the centrifuge CF operates merely to transfer the meat from the feed means to the pressurizing pump and produce some feeding pressure thereon due to centrifugal force, and the pressurizing pump PP operates in its normal manner.

From the foregoing specification it will be obvious that I have provided a continuous meat stuffer which may be selectively used as a stuffing pump only or may also extract entrained air from the meat if desired.

Some changes may be made in the construction and arrangement of the parts of my continuous meat stuffer without departing from the real spirit and purpose of my invention, and it is my intention to cover by my claims any modified forms of structure or use of mechanical equivalents which may reasonably be included within their scope.

I claim as my invention:

1. In a continuous stuffer or the like, a material pump comprising a first disc, a pair of discs on opposite sides of said first disc, power operated driving means for imparting relative rotation between said first disc and said pair of discs, one of said pair of discs having a material receiving opening, the other of said pair of discs having a material discharge opening, said openings being radially spaced from each other, and said first disc having a material guiding slot which is spirally arranged with one end registering with said material receiving opening and the other end registering with said material discharge opening, the spiralling direction being such that upon such relative rotation material in said guide slot is propelled from said receiving opening to said discharge opening, said slot widening from said receiving opening toward said discharge opening and its average width being greater than the thickness of said first disc to provide greater drag area between the material and said pair of discs than between the material and the sides of said slot.

2. In a continuous stuffer or the like, a pump comprising a first disc, a pair of discs on opposite sides of said first disc, power operated driving means for relatively rotating said pair of discs in relation to said first disc, one of said pair of discs having a material receiving opening, the other of said pair of discs having a material discharge opening, said openings being radially spaced from each other, said first disc having a material guiding slot which is spirally arranged with one end registering with said material receiving opening and the other end registering with said material discharge opening, the spiralling direction being such that upon such rotation material in said guide slot is propelled from said receiving opening to said discharge opening, the average width of said guide slot being greater than the thickness of said first disc to provide greater drag area between the material and said pair of discs than between the material and the sides of said slot.

3. In a continuous stuffer or the like, a pump comprising a first disc, a pair of discs on opposite sides of said first disc, means for relatively rotating said pair of discs in relation to said first disc, one of said pair of discs having a material receiving opening, the other of said pair of discs having a material discharge opening, said openings being radially spaced from each other, said first disc having a material guiding slot which is spirally arranged with one end registering with said material receiving opening and the other end registering with said material discharge opening, and the spiralling direction being such that upon relative rotation of said discs material in said guide slot is propelled from said receiving opening to said discharge opening.

4. In a continuous meat stuffer, a meat pump comprising a first disc, a pair of discs on opposite sides of said first disc and relatively rotatable in respect thereto, one of said pair of discs having a meat receiving opening, the other of said pair of discs having a meat discharge opening, said openings being radially spaced from each other, and a meat guiding slot in said first disc which is spirally arranged with one end registering with said meat receiving opening and the other end registering with said meat discharge opening.

5. In a continuous stuffer or the like, a material pump comprising a first disc, a pair of discs on opposite sides of said first disc, power operated driving means for imparting relative rotation between said first disc and said pair of discs, one of said pair of discs having a material receiving opening, the other of said pair of discs having a material discharge opening, said openings being radially spaced from each other, and said first disc having a material guiding slot which is spirally arranged with one end registering with said material receiving opening and the other end registering with said material discharge opening, the spiralling direction being such that upon such relative rotation material in said guide slot is propelled from said receiving opening to said discharge opening, said slot widening from said receiving opening toward said discharge opening and its average width being greater than the thickness of said first disc to provide greater drag area between the material and said pair of discs than between the material and the sides of said slot, and a centrifuge comprising a cone-shaped chamber and an air filter for feeding material to said receiving opening and extracting entrained air from the material.

6. In a continuous stuffer or the like, a material pump comprising a first disc, a pair of discs on opposite sides of said first disc, power operated driving means for imparting relative rotation between said first disc and said pair of discs, one of said pair of discs having a material receiving opening, the other of said pair of discs having a material discharge opening, said openings being radially spaced from each other, and said first disc having a material guiding slot which is spirally arranged with one end registering with said material receiving opening and the other end registering with said material discharge opening, the spiralling direction being such that upon such relative rotation material in said guide slot is propelled from said receiving opening to said discharge opening, said slot widening from said receiving opening toward said discharge opening and its average width being greater than the thickness of said first disc to provide greater drag area between the material and said pair of discs than between the material and the sides of said slot, a centrifuge comprising a cone-shaped chamber and an air filter for feeding material to said receiving opening and extracting entrained air from the material, power operated driving means for rapidly rotating said chamber, a passageway adjacent the axis of rotation of said chamber to receive filtered air from said filter means and discharge it by centrifugal force from said centrifuge, a hopper, an auger housing, an auger therein for feeding material to said centrifuge, and means for slowly rotating said auger.

7. In a continuous stuffer or the like, a material pump comprising a first disc, a pair of discs on opposite sides of said first disc, power operated driving means for imparting relative rotation between said first disc and said pair of discs, one of said pair of discs having a material receiving opening, the other of said pair of discs having a material discharge opening, said openings being radially spaced from each other, and said first disc having a material guiding slot which is spirally arranged with one end registering with said material receiving opening and the other end registering with said material discharge opening, the spiralling direction being such that upon such relative rotation material in said guide slot is propelled from said receiving opening to said discharge opening, said slot widening from said receiving opening toward said discharge opening and its average width being greater than the thickness of said first disc to provide greater drag area between the material and said pair of discs than between the material and the sides of said slot, a centrifuge for feeding material to said receiving opening and extracting entrained air from the material, said centrifuge comprising a radially extending cone-shaped chamber, power operated driving means for rapidly rotating said chamber to cause centrifugal force to act on the meat and entrained air therein, the inner wall of said chamber having filter means to pass air but prevent the passage of material, and a passageway adjacent the axis of rotation of said chamber to receive filtered air from said filter means and discharge it by centrifugal force from said centrifuge.

8. In a continuous meat stuffer, a meat pump comprising a first disc, a pair of discs on opposite sides of said first disc and relatively rotatable in respect thereto, one of said pair of discs having a meat receiving opening, the other of said pair of discs having a meat discharge opening, said openings being radially spaced from each other, said first disc having a meat guiding slot which is spirally arranged with one end registering with said meat receiving opening and the other end registering with said meat discharge opening.

9. In a continuous meat stuffer, a meat pump comprising a first disc, a pair of discs on opposite sides of said first disc and relatively rotatable in respect thereto, one of said pair of discs having a meat receiving opening, the other of said pair of discs having a meat discharge opening, said openings being radially spaced from each other, said first disc having a meat guiding slot which is spirally arranged with one end registering with said meat receiving opening and the other end registering with said meat discharge opening, a cone-shaped chamber for feeding meat to said receiving opening, power operated driving means for rapidly rotating said chamber to cause centrifugal force to act on the meat and entrained air therein, the inner wall of said chamber having filter means to pass air but prevent the passage of meat, and a passageway adjacent the axis of rotation of said chamber to receive filtered air from said filter means and discharge it outside said chamber.

10. In a continuous stuffer or the like, a material pump comprising a first disc, a pair of discs on opposite sides of said first disc, power operated driving means for imparting relative rotation between said first disc and said pair of discs, one of said pair of discs having a material discharge opening, the other of said pair of discs having a material receiving opening, said openings being radially spaced from each other, and said first disc having a material guiding slot which is spirally arranged with one end registering with said material receiving opening and the other end registering with said material discharge opening, the spiralling direction being such that upon such relative rotation material in said guide slot is propelled from said receiving opening to said discharge opening, said slot widening from said receiving opening toward said discharge opening and its average width being greater than the thickness of said first disc to provide greater drag area between the material and said pair of discs than between the material and the sides of said slot, a radially extending chamber for feeding material to said receiving opening, power operated driving means for rapidly rotating said chamber to cause centrifugal force to act on the material and entrained air therein, the inner wall of said chamber comprising a series of face-to-face discs constituting filter means to pass air but prevent the passage of material, and passageway means adjacent the axis of rotation of said chamber to receive filtered air from said filter means and discharge it outside said chamber.

11. In a continuous stuffer or the like, a pump comprising a first disc, a pair of discs on opposite sides of said first disc, means for relatively rotating said pair of discs in relation to said first disc, one of said pair of discs having a material receiving opening, the other of said pair of discs having a material discharge opening, said openings being radially spaced from each other, said first disc having a material guiding slot which is spirally arranged with one end registering with said material receiving opening and the other end registering with said material discharge opening, the spiralling direction being such that upon relative rotation of said discs material in said guide slot is propelled from said receiving opening to said discharge opening, a centrifuge for feeding material to said receiving opening comprising a radially extending cone-shaped chamber, means for rapidly rotating said chamber to cause centrifugal force to act on the material and entrained air therein, the inner wall of said chamber comprising a series of discs of graduated diameter which permit the passage of air under pressure when said discs are assembled face to face, said discs constituting filter means to pass air but prevent the passage of material, means adjacent the axis of rotation of said chamber to receive filtered air from said filter means, means to discharge the air outside said chamber by centrifugal force, and means for feeding material to said centrifuge.

12. In a continuous stuffer or the like, a material pump comprising a first disc, a pair of discs on opposite sides of said first disc, means for imparting relative rotation between said first disc and said pair of discs, one of said pair of discs having a material receiving opening, the other of said pair of discs having a discharge opening, said openings being radially spaced from each other, said first disc having a material guiding slot which is spirally arranged with one end registering with said material receiving opening and the other end registering with said material discharge opening, the spiralling direction being such that upon such relative rotation of said discs material in said guide slot is propelled from said receiving opening to said discharge opening, a centrifuge for feeding material to said receiving opening and extracting entrained air from the material, said centrifuge comprising a radially extending chamber, means for rapidly rotating said chamber to cause centrifugal force to act on the material and entrained air therein, the inner wall of said chamber comprising a series of discs which permit the passage of air under pressure exerted by the material under the action of centrifugal force to flow inwardly between the faces of said discs but prevent the passage of material, means adjacent the axis of rotation of said chamber to receive filtered air from said discs, and means to discharge it outside said chamber by centrifugal force through passageways leading from said air receiving means.

13. In a stuffer or the like, a material pump comprising a first disc, a pair of discs on opposite sides of said first disc, means for imparting relative rotation between said first disc and said pair of discs, one of said pair of discs having a material receiving opening, the other of said pair of discs having a material discharge opening, said openings being radially spaced from each other, said first disc having a material guiding slot which is spirally arranged with one end registering with said material receiving opening and the other end registering with said material discharge opening, the spiralling direction being such that upon such relative rotation of said discs material in said guide slot is propelled from said receiving opening to said discharge opening, a centrifuge for feeding material to said receiving opening and extracting entrained air from the material comprising a radially extending cone-shaped chamber, means for rapidly rotating said chamber to cause centrifugal force to act on the meat and entrained air therein, the inner wall of said chamber comprising a series of discs of graduated diameter which permit the passage of air under pressure when said discs are assembled face to face, said discs constituting filter means to pass air but prevent the passage of material, and means adjacent the axis of rotation of said chamber to receive filtered air from said filter means and discharge it outside said chamber by centrifugal force through passageways leading from said air receiving means to the periphery of said chamber.

14. In a continuous meat stuffer, a meat pump comprising a first disc, a pair of discs on oposite sides of said first disc and relatively rotatable in respect thereto, said pair of discs being provided with meat receiving and meat discharge openings radially spaced from each other, and said first disc having a meat guiding slot which is spirally arranged with one end registering with said meat receiving opening and the other end registering with said meat discharge opening.

15. In a continuous meat stuffer, a meat pump comprising a first disc, a pair of discs on opposite sides of said first disc and relatively rotatable in respect thereto, said pair of discs being provided with meat receiving and meat discharge openings spaced from each other laterally of the direction of rotation, and said first disc having a meat guiding slot with one end thereof registering with said meat receiving opening and the other end thereof registering with said meat discharge opening, said slot being inclined relative to the direction of rotation so as to propel meat from said meat receiving opening to said meat discharge opening upon such relative rotation.

16. In a continuous meat stuffer, a meat pump comprising stationary and revolving discs means, said stationary disc means being provided with meat receiving and meat discharge openings radially spaced from each other, and said revolving disc means having a meat guiding slot which is spirally arranged with one end registering with said meat receiving opening and the other end registering with said meat discharge opening.

References Cited in the file of this patent

UNITED STATES PATENTS

| | | |
|---|---|---|
| 537,316 | Stich | Apr. 9, 1895 |
| 1,038,607 | Lawson | Sept. 17, 1912 |
| 2,125,453 | Lindgren | Aug. 2, 1938 |
| 2,373,865 | Walter | Apr. 17, 1945 |
| 2,377,069 | Brubaker | May 29, 1945 |
| 2,403,089 | Lars | July 2, 1946 |
| 2,808,201 | Mayeux | Oct. 1, 1957 |